(12) United States Patent
Lin et al.

(10) Patent No.: US 11,329,328 B2
(45) Date of Patent: May 10, 2022

(54) ABNORMALITY DETECTOR

(71) Applicant: OMRON Corporation, Kyoto (JP)

(72) Inventors: Po-Hsiu Lin, New Taipei (TW); Toshiaki Okuno, Shiga (JP); Yoshitaka Adachi, Tokyo (JP); Takayuki Haruyama, Shiga (JP)

(73) Assignee: Omron Corporation, Kyoto (JP)

( * ) Notice: Subject to any disclaimer, the term of this patent is extended or adjusted under 35 U.S.C. 154(b) by 484 days.

(21) Appl. No.: 15/836,319

(22) Filed: Dec. 8, 2017

(65) Prior Publication Data

US 2018/0226698 A1 Aug. 9, 2018

(30) Foreign Application Priority Data

Feb. 3, 2017 (JP) .............................. JP2017-018974

(51) Int. Cl.
*H01M 10/48* (2006.01)
*H01M 10/42* (2006.01)
(Continued)

(52) U.S. Cl.
CPC ....... *H01M 10/486* (2013.01); *H01M 10/052* (2013.01); *H01M 10/0525* (2013.01);
(Continued)

(58) Field of Classification Search
CPC .... H01M 10/48; H01M 10/42; H01M 10/052; H01M 10/452; H01M 10/0525; H01M 10/486; H01M 10/4285; H01M 10/4235
(Continued)

(56) References Cited

U.S. PATENT DOCUMENTS

| 5,126,649 A | 6/1992 | Osanai | |
|---|---|---|---|
| 2004/0247994 A1* | 12/2004 | Masuda | H02J 7/0063 |
| | | | 429/66 |

(Continued)

FOREIGN PATENT DOCUMENTS

| CN | 101411004 A | 4/2009 |
|---|---|---|
| CN | 101726388 A | 6/2010 |

(Continued)

OTHER PUBLICATIONS

Office Action issued in Korean Application No. 10-2017-0161480, dated Dec. 12, 2018 (12 pages).

(Continued)

*Primary Examiner* — Richard Isla
*Assistant Examiner* — Dung V Bui
(74) *Attorney, Agent, or Firm* — Osha Bergman Watanabe & Burton LLP

(57) ABSTRACT

Provided is a technique capable of detecting deformation based on an abnormality such as heat generation in an article by a simpler, smaller, or lower-cost configuration, to suppress occurrence of an accident due to the abnormality of the article. An abnormality detector for measuring deformation of a battery B, such as a lithium-ion battery, to detect an abnormality of the battery, the abnormality detector includes: a sealed container disposed in close contact with at least a part of an outer surface of the battery, while containing and sealing a fluid such as water, the sealed container having flexibility; and a pressure sensor configured to measure a change inside the sealed container, accompanying deformation of the battery.

9 Claims, 13 Drawing Sheets

(51) Int. Cl.
*H01M 10/0525* (2010.01)
*H01M 10/052* (2010.01)

(52) U.S. Cl.
CPC ..... *H01M 10/425* (2013.01); *H01M 10/4235* (2013.01); *H01M 10/4285* (2013.01); *H01M 10/48* (2013.01)

(58) Field of Classification Search
USPC ......................................................... 320/136
See application file for complete search history.

(56) References Cited

U.S. PATENT DOCUMENTS

| | | | |
|---|---|---|---|
| 2008/0110267 A1* | 5/2008 | Sheikh-Bahaie | ... B60C 23/0408 73/700 |
| 2009/0053586 A1* | 2/2009 | Fredriksson | ........ H01M 50/183 429/57 |
| 2010/0062322 A1 | 3/2010 | Murata | |
| 2010/0112420 A1 | 5/2010 | Back | |
| 2010/0195696 A1* | 8/2010 | Ishikawa | ................. G01K 1/14 374/100 |
| 2011/0212349 A1 | 9/2011 | Naruse et al. | |
| 2013/0257382 A1* | 10/2013 | Field | ..................... H02J 7/0086 320/134 |
| 2014/0106184 A1 | 4/2014 | Xie et al. | |
| 2014/0170446 A1* | 6/2014 | Elian | ....................... G01M 3/36 429/61 |
| 2015/0123468 A1* | 5/2015 | Wu | ......................... H02H 1/00 307/10.1 |
| 2015/0163958 A1* | 6/2015 | Oguma | ............... H05K 9/0024 264/36.22 |
| 2015/0226810 A1 | 8/2015 | Elian et al. | |
| 2015/0380778 A1* | 12/2015 | Kim | ..................... H01M 10/48 429/61 |
| 2016/0064780 A1 | 3/2016 | Jarvis et al. | |
| 2016/0064958 A1* | 3/2016 | Jung | ..................... H02J 7/0091 320/107 |
| 2016/0181576 A1 | 6/2016 | Zouta et al. | |
| 2016/0296990 A1* | 10/2016 | Muramoto | ............. B21D 22/10 |
| 2017/0002982 A1* | 1/2017 | Carron | .................. F17C 13/025 |

FOREIGN PATENT DOCUMENTS

| | | | |
|---|---|---|---|
| CN | 102273002 A | 12/2011 | |
| CN | 102356497 A | 2/2012 | |
| CN | 103868533 A | 6/2014 | |
| DE | 102015201535 A1 * | 8/2016 | ............ H01M 10/48 |
| JP | H03-293935 A | 12/1991 | |
| JP | 2003217670 A | 7/2003 | |
| JP | 2008251307 A | 10/2008 | |
| JP | 2009-76265 A | 4/2009 | |
| JP | 2014044929 A | 3/2014 | |
| JP | 2014-120355 A | 6/2014 | |
| JP | 2016-177941 A | 10/2016 | |
| KR | 10-2010-0049309 A | 5/2010 | |
| WO | 2011013645 A1 | 2/2011 | |
| WO | 2014208423 A1 | 12/2014 | |

OTHER PUBLICATIONS

Office Action issued in Japanese Application No. 2017018974; dated Oct. 29, 2019 (9 pages).

Office Action issued in Chinese Application No. 201711239289.2; dated Nov. 22, 2019 (16 pages).

Office Action issued in Chinese Application No. 201711239289.2; dated Sep. 3, 2020 (17 pages).

* cited by examiner

ABNORMALITY DETECTOR

CROSS-REFERENCE TO RELATED APPLICATION

This application is based on Japanese Patent Application No. 2017-018974 filed with the Japan Patent Office on Feb. 3, 2017, the entire contents of which are incorporated herein by reference.

FIELD

The present invention relates to an abnormality detector for detecting deformation based on an abnormality such as heat generation in an article.

BACKGROUND

In recent years, there has been a growing demand for a technique of detecting an abnormality such as heat generation in an article. For example, although a lithium-ion battery used in a mobile phone or the like is in wide use as a high-performance power supply, it has the possibility of causing an accident such as heat generation, smoking, or ignition when conditions are met, and hence improvement in safety has been required.

In relation to this, there is known a battery monitor for monitoring a lithium-ion battery, the battery monitor including: a state quantity acquisition part configured to acquire a state quantity representing an expansion state of the lithium-ion battery; a change amount operation part configured to obtain a time change in the state quantity acquired by the state quantity acquisition part; and a monitoring part configured to monitor the time change obtained by the change amount operation part and compare the time change with a time change reference value indicating deterioration obtained in advance (e.g., see Japanese Unexamined Patent Application Publication No. 2014-120355). However, this device is large in scale and difficult to apply to a small-sized consumer product such as a mobile phone. Further, it has been considered that this device is disadvantageous in having a configuration so complicated as to increase its cost.

Further, there is known a battery state detector including: a sensor in contact with a battery and configured to detect a surface shape change in the battery; and a determination circuit configured to perform an arithmetic process on an output of the sensor and measure the state of the surface shape change in the battery and internal resistance of the battery to determine the state of the battery (e.g., see Japanese Unexamined Patent Application Publication No. 2016-177941). However, this technique requires placement of sensors on as many surfaces as possible in the battery, which might increase cost. Further, this device is disadvantageous in having large power consumption and having difficulties in detecting minute changes in shape.

SUMMARY

The present invention has been made in view of the above circumstances, and it is an object of the present invention to provide a technique capable of detecting deformation based on an abnormality such as heat generation in an article by a simpler, smaller, or lower-cost configuration, to suppress occurrence of an accident due to the abnormality of the article.

In order to solve the above problems, the present invention provides an abnormality detector for measuring deformation of an article to detect an abnormality of the article, the abnormality detector including: a sealed body disposed in close contact with at least a part of an outer surface of the article, while containing and sealing a predetermined fluid, the sealed body having flexibility; and a sensor configured to measure a change in pressure of the fluid contained in the sealed body, accompanying deformation of the article.

That is, in the present invention, a sealed body with flexibility while containing and sealing a fluid is brought into close contact with at least a part of the outer surface of the article. Then, the deformation of the article is converted into a change in pressure of the fluid sealed in the sealed body and measured by the sensor. According to this, in whichever portion of the sealed body the sensor is provided, it is possible to measure deformation of the portion in close contact with the sealed body in the article, thereby eliminating the need to dispose sensors in all deformation measurement regions in the article and this enables accurate measurement of deformation in a wide range of the article by a small number of sensors.

Further in the present invention, the sensor may be disposed in contact with an outer surface of the sealed body. By disposing the sensor to be in contact with the outer surface of the sealed body, it is possible to more easily measure the deformation of the article by measuring the change in pressure of the fluid by the sensor disposed outside. In this case, by fixing and disposing the sensor on the surface of other member in contact with the sealed body, it is possible to detect a change in the pressure of the fluid in the sealed body in a state where the sensor is pressed against the sealed body and more reliably measure the deformation of the article.

Further in the present invention, the sensor may be disposed inside the sealed body. According to this, it is possible to directly detect the change in pressure of the fluid accompanying deformation of the article by the sensor. Further, in this case, by disposing the sealed body between the article and the other member, it is possible to make the change in the internal pressure of the sealed body more prominent when the article is deformed, and to more easily and reliably detect the deformation of the article.

Further, the present invention may provide an abnormality detector for measuring deformation of an article to detect an abnormality of the article, the abnormality detector including: a sealed body containing and sealing a predetermined fluid and the article; and a sensor configured to measure a change in pressure of the predetermined fluid contained in the sealed body, accompanying deformation of the article.

In this case, the article which is a measuring target for deformation and the predetermined fluid are contained in the sealed body. Also, the sensor is disposed inside the sealed body together with the article and the predetermined fluid. Then, the deformation of the article is converted into a change in pressure of the predetermined fluid inside the sealed body and detected by the sensor. According to this, even when deformation occurs in any position of the article, it is possible to accurately measure the deformation by a small number of sensors. Also, in this case, the sealed body may not necessarily need to have flexibility.

Further, in the present invention, a temperature measurement unit configured to measure a temperature of the article may further be provided. Here, when the article is deformed due to some abnormality, a change in temperature is involved in many cases. For example, a chemical change may occur inside the article. According to this, it is possible to measure the change in the temperature of the article in accordance with the deformation accompanying the abnormality of the article and detect the abnormality of the article more accurately based on these two parameters. In this case, the temperature measurement unit may be a temperature sensor, and the temperature sensor may be provided in a package of a sensor for measuring pressure. Alternatively, it may be a unit for estimating a temperature from another parameter.

Further, in the present invention, the sensor may detect a periodic component in a predetermined frequency region in addition to a non-periodic component in the change in pressure of the predetermined fluid. According to this, in addition to non-periodic deformation of the article, an abnormality such as boiling due to heat generation inside the article can also be detected.

Further, in the present invention, the predetermined fluid may be made of a flame-retardant substance. More specifically, for example, flame-retardant silicone or flame-retardant liquid (water etc.) may be contained. Further, the predetermined fluid may contain at least any one of an inert gas, a carbon dioxide gas, and a nitrogen gas. According to this, even when the article is ignited or the like due to an abnormality, it is possible to suppress the ignition from spreading to the predetermined fluid.

Further, in the present invention, the sealed body may be formed of a flame-retardant substance. According to this, even when the article is ignited or the like due to an abnormality, it is possible to suppress the ignition from spreading to the sealed body. In this case, the sealed body may be formed of, for example, a flame-retardant PET film, a flame-retardant PPS film, or a flame-retardant aramid film.

Further, in the present invention, a thermal conductivity of the predetermined fluid may be 0.1 W/(mK) or higher. This makes it possible to more accurately transfer the change in the temperature of the article to the sensor and more accurately measure the change in the temperature of the article. As the fluid, for example, water (thermal conductivity=0.5 W/(mK) or higher) and silicone oil (thermal conductivity=0.2 W/(mK) or higher) may be used as the predetermined fluid.

Further, in the present invention, a thermal conductivity of the sealed body may be 0.1 W/(mK) or higher. According to this, it is possible to more accurately transfer the change in the temperature of the article to the sensor and more accurately measure the change in the temperature of the article.

Further, in the present invention, the sealed body may be formed of a material having a tensile strength of 50 N/mm$^2$ or higher. This makes it possible to more reliably convert the deformation of the article into an increase in pressure of the predetermined fluid and improve the detection accuracy of deformation of the article.

Further, in the present invention, the article may be a lithium-ion battery. This makes it possible to more reliably detect a serious abnormality occurring in a mobile device or the like, such as heat generation, smoking, or ignition of the lithium-ion battery, and lead to a preliminary measure.

Further, in the present invention, the article may be a lithium-ion battery, the abnormality detector may further include a controller configured to control a function of the lithium-ion battery, and when pressure higher than a predetermined value is measured by the sensor, the controller may stop a charging function of the lithium-ion battery.

According to this, when an abnormality of the lithium-ion battery is detected, it is possible to stop the charging function and minimize overcharging, to thereby suppress the occurrence of further heat generation, smoking, and ignition.

Further, in the present invention, the article may be a lithium-ion battery, the abnormality detector may further include a controller configured to control a function of the lithium-ion battery, and when a temperature of the article which is higher than a predetermined value is measured, the controller may stop a function of the lithium-ion battery. According to this, it is possible to minimize thermal runaway of the lithium-ion battery.

Further, in the present invention, the sensor may be disposed while sandwiched between an outer surface of the sealed body and other member whose relative movement with respect to the article may be restricted. According to this, since the relative movement of the sensor with respect to the article is restricted, when the article is deformed, the change in pressure of the sealed body can more reliably act on the sensor. As a result, the deformation of the article can be measured with higher sensitivity.

Further, in the present invention, the other member may be an electric substrate mounted with an electronic component, and the sensor may be mounted on the electric substrate. Hence the electric substrate mounted with the sensor is disposed in a state where its relative movement with respect to the article is restricted, and at that time, the sensor can be disposed to be in contact with the outer surface of the sealed body. As a result, it is possible to more easily configure the abnormality detector inside the device including the article and the electric substrate and measure the deformation of the article with higher sensitivity.

Further, in the present invention, the sealed body may have a recess for reducing interference with an element other than the sensor mounted on the electric substrate. Hence, by the sealed body coming into close contact with the element other than the sensor on the electric substrate, it is possible to suppress application of the stress to the element.

The sealed body may have a first portion in close contact with the article and a second portion not in close contact with the article but in which the sensor is disposed, and the second portion may be made thicker than the first portion. In that case, it is possible to reduce a total thickness of the article and the sealed body and reduce the thickness of the equipment mounted with the abnormality detector according to the present invention.

Further, the present invention may provide a mobile device including any one of the abnormality detectors described above. According to this, it is possible to detect an abnormality of an article such as a lithium-ion battery at an earlier stage, and thereby to improve the safety of the mobile device.

Note that the means for solving the problem described above can be used in an appropriate combination.

According to the present invention, it is possible to detect deformation based on an abnormality such as heat generation in an article by a simpler, smaller, or lower-cost configuration, to suppress occurrence of an accident due to the abnormality of the article.

DETAILED DESCRIPTION

First Embodiment

Hereinafter, embodiments of the present invention will be described with reference to the drawings. Each of the embodiments shown below is an aspect of the present invention, and is not intended to limit the technical scope of the present invention. In the embodiment, a description will be given of an example of a case where an article as a target for abnormality detection is a lithium-ion battery.

Here, an abnormality of the lithium-ion battery will be described. Features of the lithium-ion battery are that a high voltage is obtained, an energy density is high, and a mobile device or the like can be used for a long time by one charging. It is also one of advantages of the lithium-ion battery to have no memory effect of reducing an apparent battery capacity when being additionally charged without using up all of stored electric power, like a nickel-cadmium storage battery.

However, the lithium-ion battery is disadvantageous in that at the time of charging, the voltage of the battery significantly increases and the positive electrode and the negative electrode are extremely strongly oxidized and reduced. Particularly in the case of the positive electrode, it may come into an unstable state, such as abnormal heat generation, in the case of excessive charging. Hence the lithium-ion battery is rarely sold and used singly, but in many cases, it is sold and used as a battery pack incorporating a safety device so as not to cause abnormal heat generation or ignition.

However, since a complicated and sophisticated technology is required for the safety device for the lithium-ion battery, an error such as shipment of an insulator in the battery pack with a structure that is likely to cause a short circuit might bring about an accident such as abnormal heat generation, ignition, or smoking at a temperature of several hundred degree Celsius depending on the use environment. Further, due to an impact applied to the outside of the battery pack, a protective plate for the electrode in the battery pack may be broken or bent, and as a result, the insulator of the battery pack tears and a short circuit occurs to cause abnormal heat generation. The embodiment relates to an abnormality detector for detecting an abnormality of a lithium-ion battery at an early stage to suppress an accident caused by the occurrence of the abnormality as described above.

Figure 1:
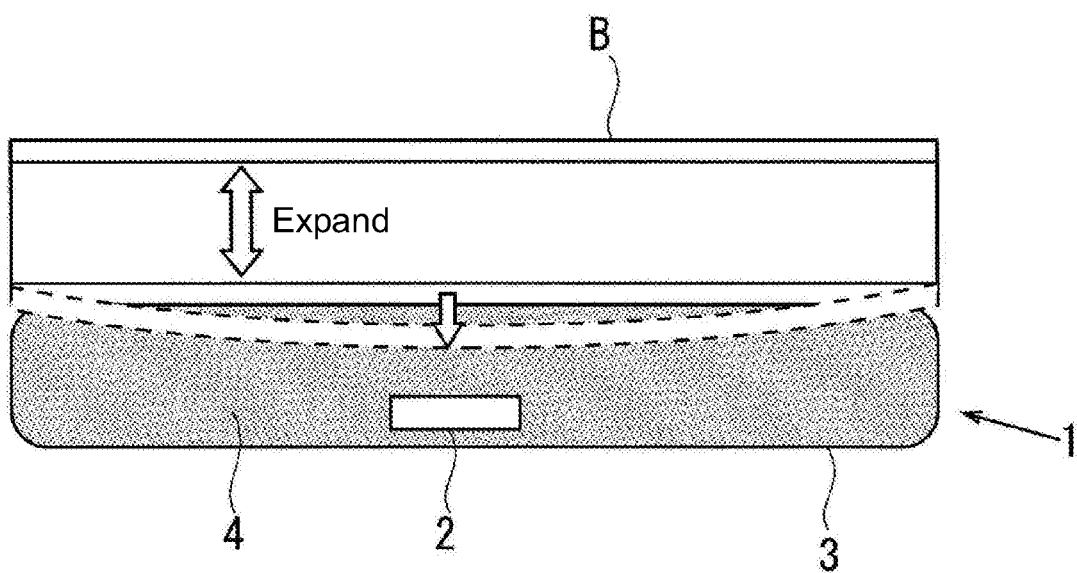
FIG. 1 is a cross-sectional view illustrating a schematic configuration of an abnormality detector according to a first embodiment of the present invention.

FIG. 1 illustrates a schematic view of an abnormality detector 1 according to the embodiment. In FIG. 1, symbol B denotes a lithium-ion battery (hereinafter, also simply referred to as a battery). The abnormality detector 1 has a sealed container 3 filled with water and a pressure sensor 2 disposed in the sealed container 3. This water is a fluid for pressure transmission. The sealed container 3 corresponds to a sealed body. The sealed container 3 containing water and the pressure sensor 2 therein is attached to, while in close contact with, the bottom surface of the battery B.

When the battery B abnormally generates heat due to the causes as described above, it first expands, and then shifts to a phenomenon of ignition and smoking. When the battery B expands due to the abnormal heat generation, the bottom surface of the battery B pushes down the sealed container 3 in FIG. 1. Since the internal pressure in the sealed container 3 then increases, the change in pressure is measured by the pressure sensor 2. At that time, even if the place to be deformed by the expansion is a part of the bottom surface of the battery B, since the deformation uniformly increases the pressure in the sealed container 3, the pressure sensor 2 can detect the deformation of the battery B, regardless of where it is disposed in the sealed container 3. Although omitted in the figure, a signal line is naturally provided for transmitting an output signal from the pressure sensor 2 to the outside while maintaining the sealed state of the sealed container 3.

Figure 2A:
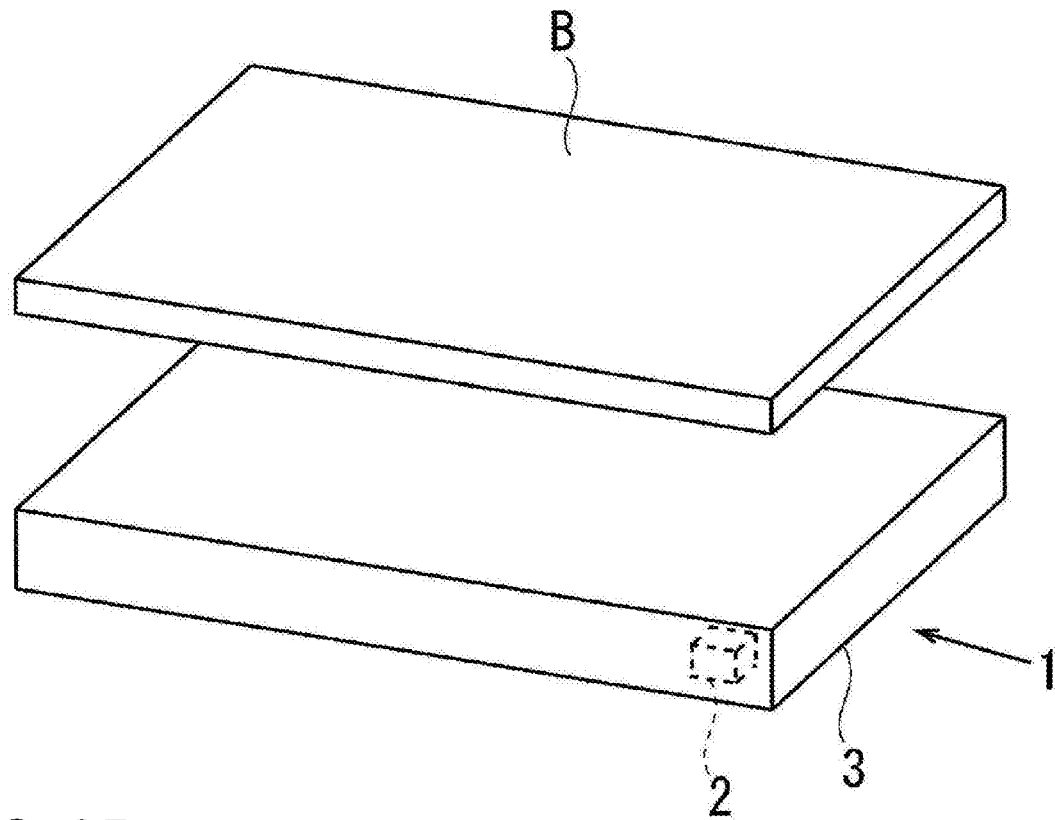
FIGS. 2A and 2B are perspective views of an abnormality detector according to the first embodiment of the present invention.
Figure 2B:
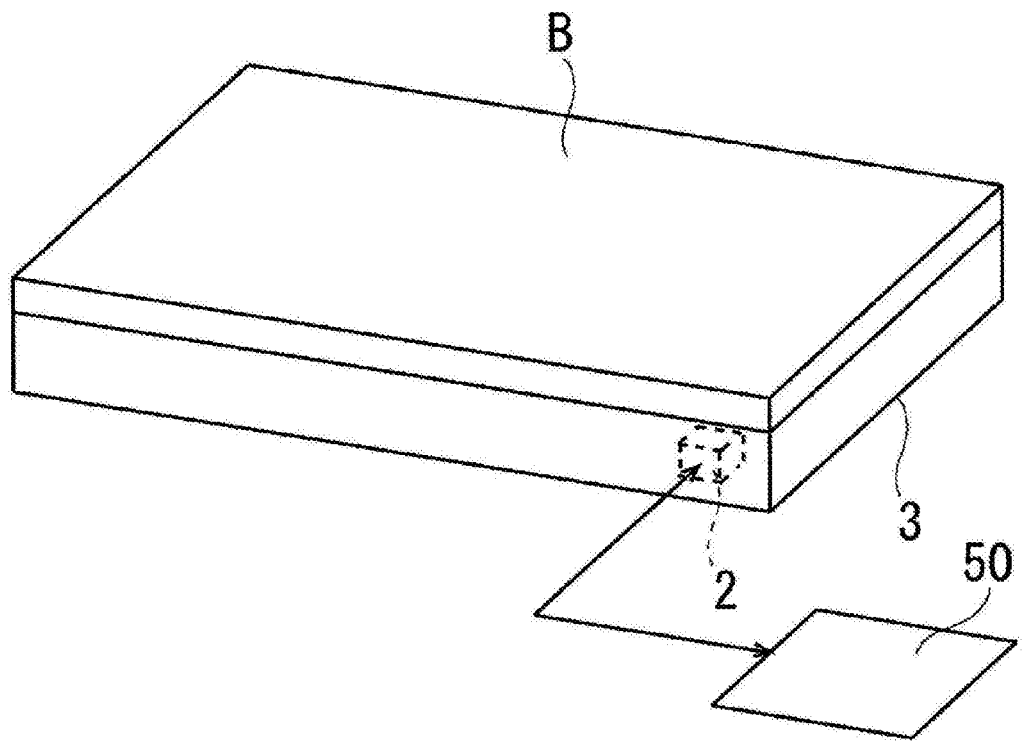

FIGS. 2A and 2B illustrate more specific perspective views of the abnormality detector 1 in the embodiment. FIG. 2A is a view in a state where the battery B and the abnormality detector 1 are separated, and FIG. 2B is a view in a state where the sealed container 3 of the abnormality detector 1 is in close contact with the battery B. In the embodiment, the battery B has a relatively flat rectangular parallelepiped shape on the premise that it is housed in a mobile device such as a smartphone. The sealed container 3 has a flat rectangular parallelepiped shape similar to that of the battery B so as to be able to be housed in the mobile device together with the battery B and make a contact area with the battery B as large as possible.

Further, the pressure sensor 2 is fixed inside the side surface of the sealed container 3 so that the signal line can be easily pulled out from the side surface of the sealed container 3. At that time, a detection part of the pressure sensor 2 is disposed so as to face the inside of the sealed container 3. The pressure sensor 2 may be connected with the signal line inside the sealed container 3 and only the signal line may be pulled out from the sealed container 3 to the outside, or for example, a connector connected with an output terminal of the pressure sensor 2 may be disposed outside the sealed container 3 and an output signal of the pressure sensor 2 may be taken out by connecting the signal line to the connector from the outside.

According to the embodiment, as described above, even when any portion of the bottom surface of the battery B is deformed, the pressure in the sealed container 3 changes, and the pressure sensor 2 can detect an abnormality of the battery B. It is thus possible to reduce the size and the number of the pressure sensors 2 and reduce the size and the cost of the entire abnormality detector 1. Further, when stored in a mobile device in this state, the sealed container 3 can also serve as a buffer, and can absorb vibration and impact applied to the mobile device.

Here, the sealed container 3 is flexible, and in order to efficiently convert deformation of the battery B into a change in internal pressure, the sealed container 3 is preferably made of a material that does not easily extend, having a tensile strength of 50 N/mm$^2$ or higher. For example, it may be formed of a material obtained by laminating an aluminum film and a resin film. In such a case, it goes without saying that an insulation process is necessary for the signal line of the pressure sensor 2.

Figure 3:
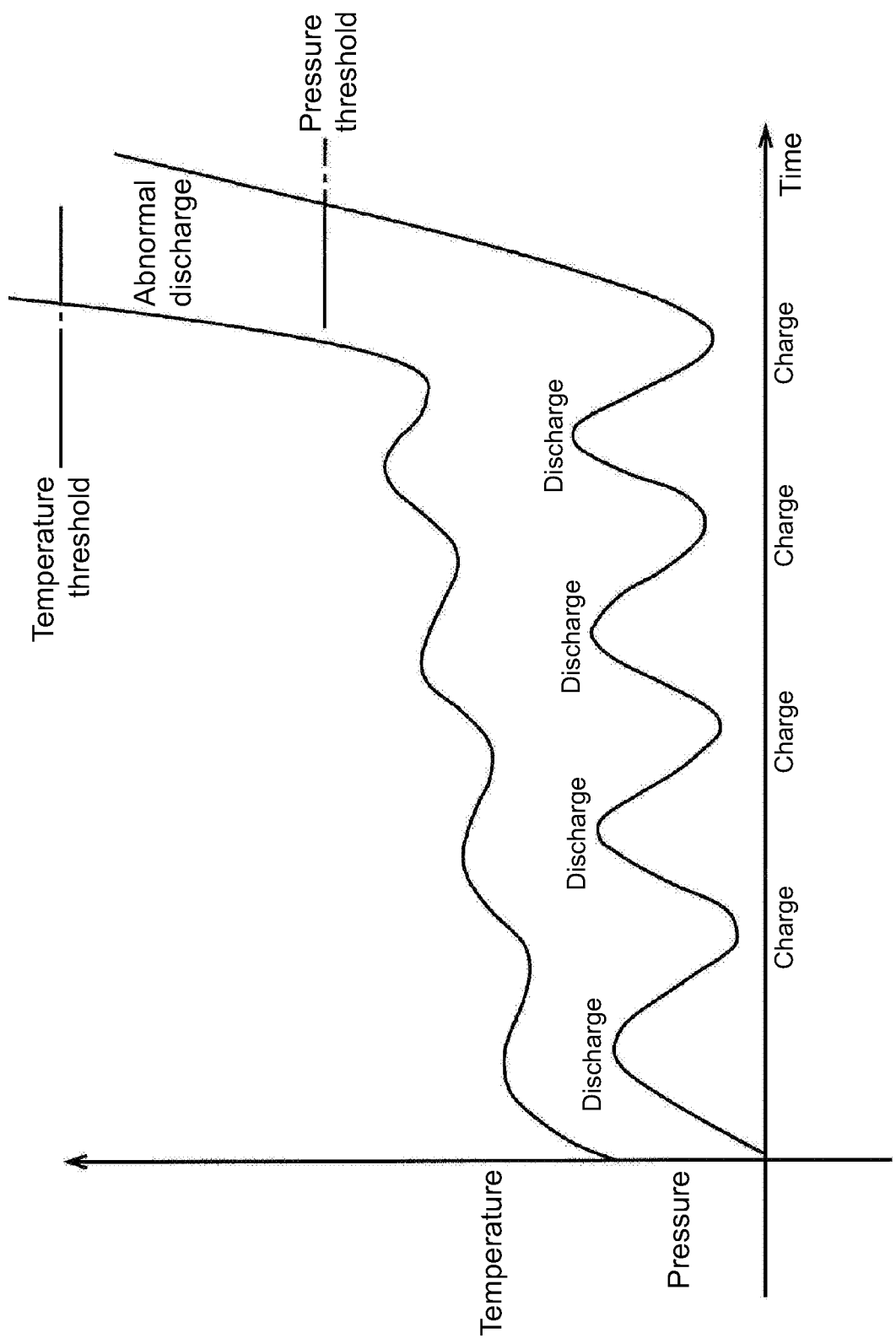
FIG. 3 is a graph illustrating changes in pressure and a temperature of a battery in a normal state and in an abnormal state.

FIG. 3 is a graph illustrating an example of changes in pressure measured by the pressure sensor 2 and a temperature measured by a temperature sensor packaged together with the pressure sensor 2 when charging and discharging of the lithium-ion battery are repeated. As illustrated in FIG. 3, the pressure measured by the pressure sensor 2 is slightly higher during discharging and slightly lower during charging. Likewise, the temperature of the lithium-ion battery is slightly higher during discharging and slightly lower during charging. When the battery B is normal, although the above pressure and temperature gradually increase on average, basically, the above changes are repeated in association with charging and discharging. However, when there is some abnormality in the battery B, the pressure and the temperature rapidly increase with abnormal discharging, resulting in smoking and ignition.

Hence the battery B may be determined to be abnormal when the pressure detected by the pressure sensor 2 exceeds a pressure threshold in FIG. 3. This makes it possible to more reliably determine an abnormality of the battery B with simple control. Further, the pressure sensor 2 measures the pressure in the sealed container 3 while the temperature sensor (not illustrated) measures the temperature of the battery B, and a determination in combination of the temperature and the pressure may be made, such as an abnormal determination which is made when the measured pressure of the pressure sensor 2 exceeds the pressure threshold in FIG. 3 and the measured temperature of the temperature sensor exceeds a temperature threshold in FIG. 3.

According to this, when the pressure detected by the pressure sensor 2 increases due to reasons other than abnormal discharging in the battery B (e.g., mechanical bending or contamination of foreign matters), it is possible to prevent an abnormal determination from being made. Further, when some abnormality of the battery B is detected at an earlier stage, the battery B may be determined to be abnormal when the detected pressure of the pressure sensor 2 exceeds the pressure threshold in FIG. 3 or the detected temperature of the temperature sensor exceeds the temperature threshold in FIG. 3. A method of combining the above two types of data is not limited to the above.

Figure 4:
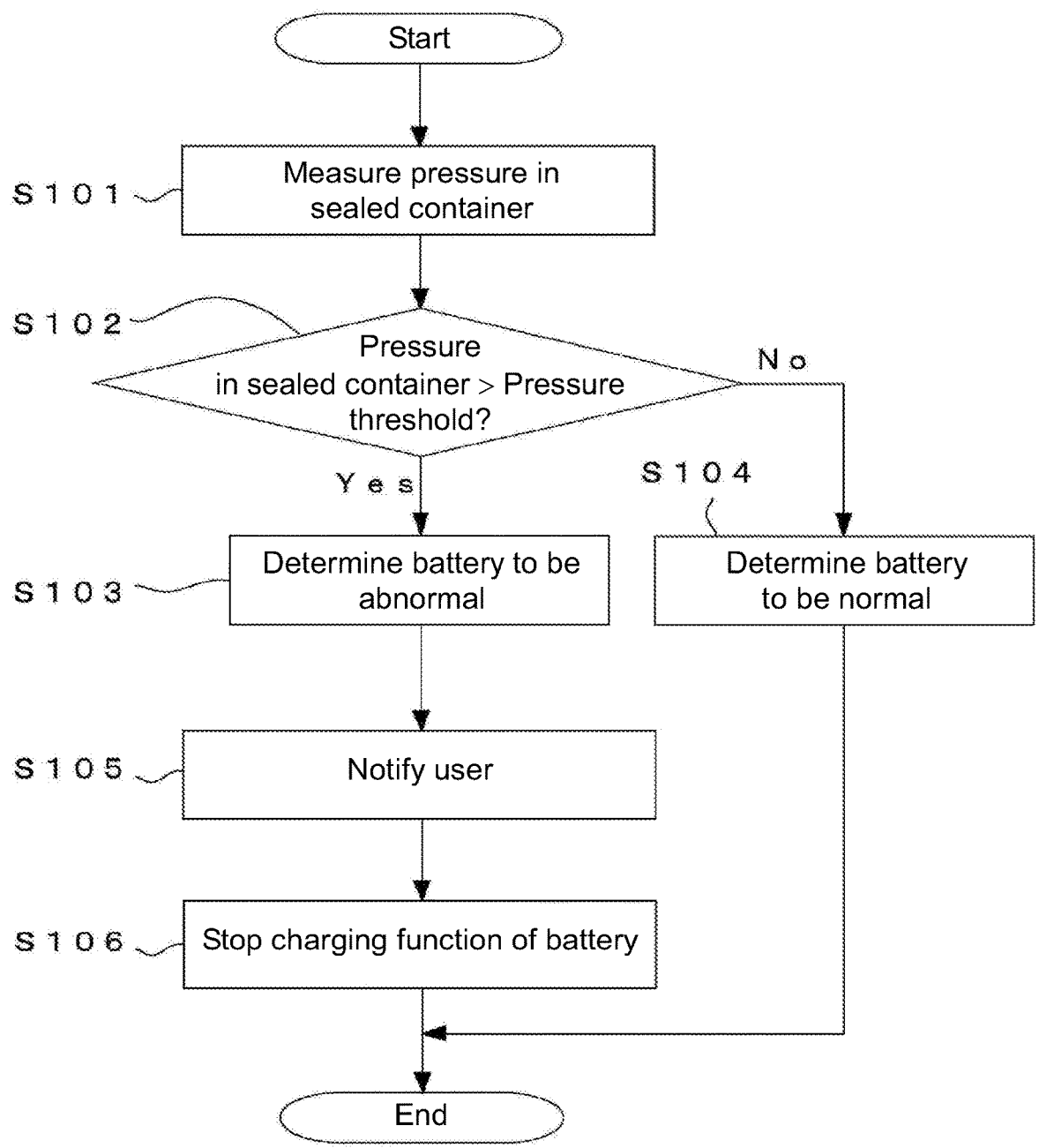
FIG. 4 is a flowchart illustrating control contents of a battery abnormality detection routine according to the present invention.

FIG. 4 illustrates a flowchart of a battery abnormality detection routine which is a program for determining an abnormality of the battery B based on pressure detected by the pressure sensor 2 in the embodiment. This routine is a program stored in a memory provided in a controller 50 that controls the abnormality detector 1 in the mobile device mounted with the abnormality detector 1, and is executed at predetermined time intervals by a CPU provided in the controller 50.

When this routine is executed, in S101, an output signal of the pressure sensor 2 is read into the controller 50, and the pressure in the sealed container 3 is measured. When the process of S101 ends, the process proceeds to S102.

In S102, it is determined whether or not the measured pressure in the sealed container 3 is higher than the pressure threshold. Here, the pressure threshold is such a threshold that the battery B is determined to be abnormal when the pressure in the sealed container 3 is higher than the pressure threshold, and is set experimentally or theoretically in advance. When an affirmative determination is made that the pressure in the sealed container 3 is higher than the pressure threshold, the process proceeds to S103. On the other hand, when a negative determination is made that the pressure in the sealed container 3 is equal to or lower than the pressure threshold, the process proceeds to S104.

In S103, the battery B is determined to be abnormal. When the process of S103 ends, the process proceeds to S105. In S105, the user is notified that an abnormality has been found in the battery B. This notification may be made by display on the mobile device or by a warning sound. Moreover, notification may be made to a specific address by a mail or the like. When the process of S105 ends, the process proceeds to S106. In S106, the controller 50 stops the charging function of the battery B. This makes it impossible to charge the battery B thereafter, and the cause of the deformation is eliminated. On the other hand, in S104, the battery B is determined to be normal When the process of S106 or S104 ends, this routine ends temporarily.

Figure 5:
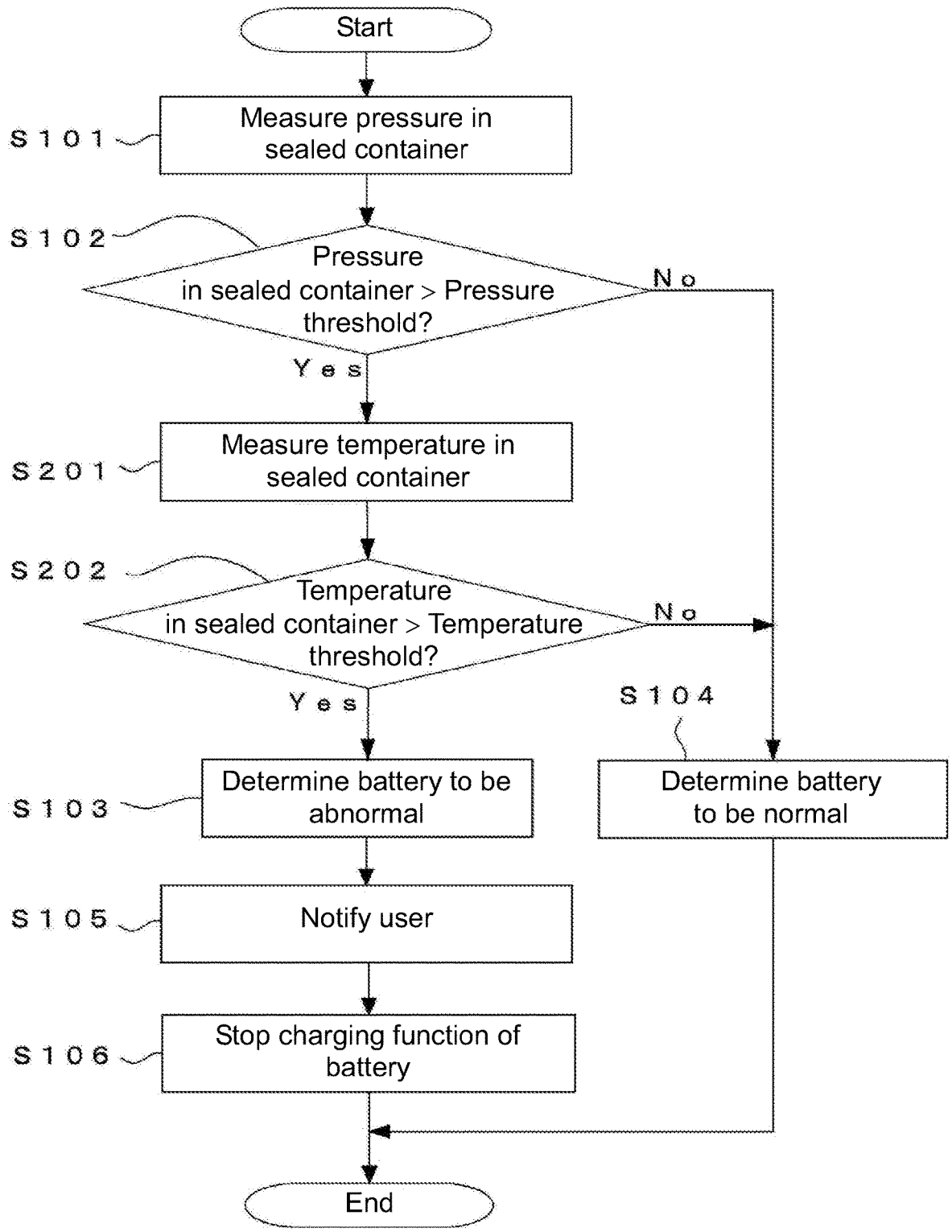
FIG. 5 is a flowchart illustrating control contents of a battery abnormality detection routine 2 according to the present invention.

Next, FIG. 5 illustrates a flowchart of a battery abnormality detection routine 2 which is a program for determining an abnormality of the battery B based on the pressure measured by the pressure sensor 2 and the temperature measured by the temperature sensor in the embodiment. This routine is also executed by the CPU of the controller 50 at predetermined time intervals. Hereinafter, a description will be given of only a difference between this routine and the battery abnormality detection routine described in FIG. 4.

In the battery abnormality detection routine 2, when it is determined in S102 that the pressure in the sealed container 3 is higher than the pressure threshold, the battery is not immediately determined to be abnormal, but in S201, the temperature in the sealed container 3 is further measured by the temperature sensor as the temperature measurement unit packaged in the sealed container 3 together with the pressure sensor 2. Then in S202, it is determined whether or not the temperature in the sealed container 3 is higher than the temperature threshold. Here, the temperature threshold is such a threshold of a temperature that the battery B is determined to be abnormal when the pressure in the sealed container 3 is higher than the pressure threshold and the temperature in the sealed container 3 is higher than the temperature threshold, and is set experimentally or theoretically in advance. When an affirmative determination is made that the temperature in the sealed container 3 is higher than the temperature threshold, the process proceeds to S103, and the battery B is determined to be abnormal. Since the subsequent processes of S105 and S106 are the same as those in the battery abnormality detection routine, the description will be omitted.

On the other hand, when a negative determination is made in S202 that the temperature in the sealed container 3 is equal to or lower than the temperature threshold, it is determined that the pressure increase in the sealed container 3 is due to, for example, a mechanical reason, and the process proceeds to S104, where the battery B is determined to be normal. When the processes of S104 or S106 end, this routine ends temporarily.

As thus described, when the battery abnormality detection routine 2 is executed, it is determined whether or not the battery B is in an abnormal state in consideration of not only the pressure in the sealed container 3 but also the temperature, and it is thereby possible to make a more accurate determination and suppress erroneous determination.

Figure 6:
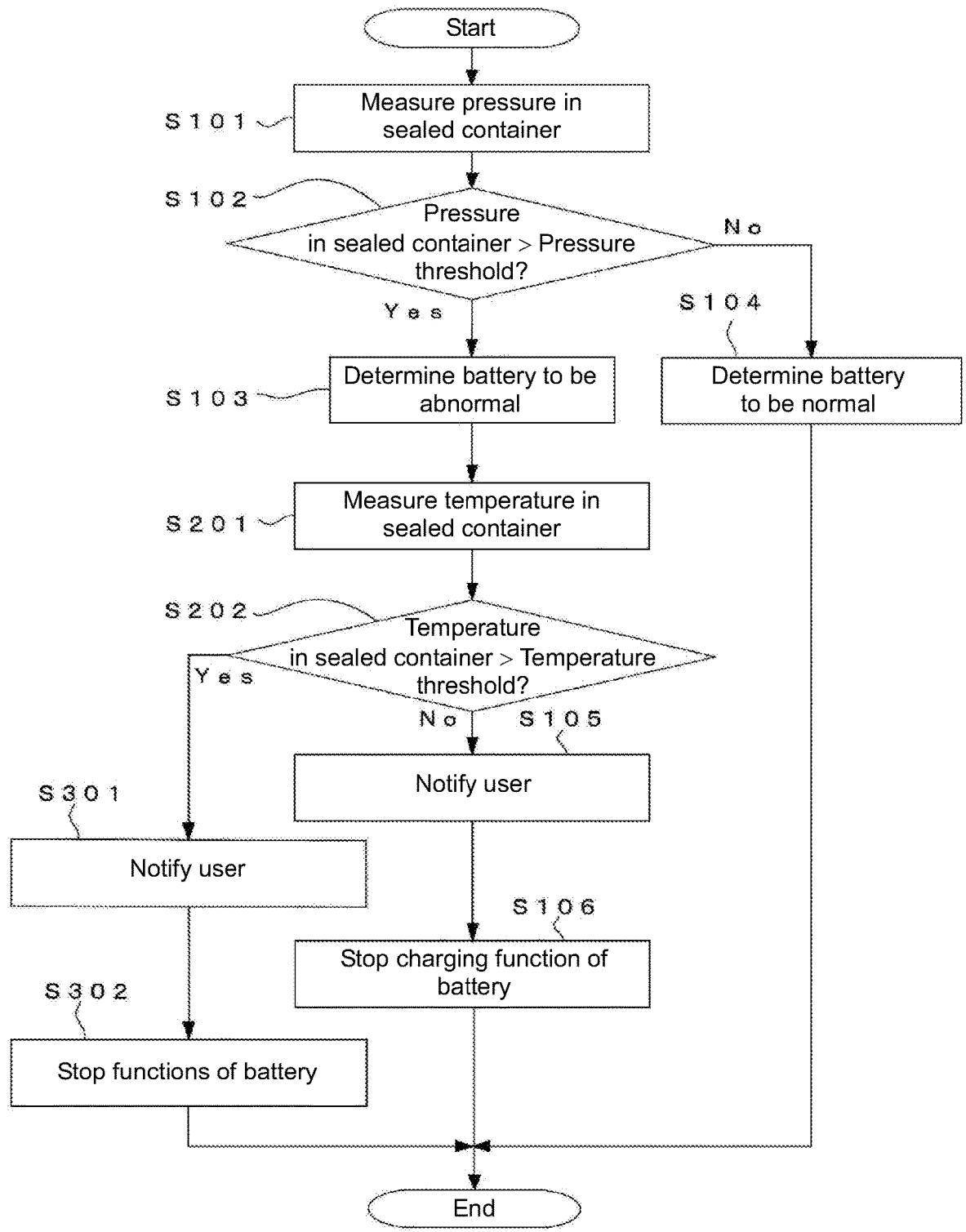
FIG. 6 is a flowchart illustrating control contents of a battery abnormality detection routine 3 according to the present invention.

Next, a battery abnormality detection routine 3 will be described with reference to FIG. 6. In this routine, when it is determined that the pressure in the sealed container 3 is higher than the pressure threshold, the temperature in the sealed container 3 is further measured, and the control content of the battery B is changed between a case where the measured temperature in the sealed container 3 is higher than the temperature threshold and otherwise. Hereinafter, only differences from the battery abnormality detection routine 2 will be described. In this routine, when a negative determination is made in S202 that the temperature in the sealed container 3 is equal to or lower than the temperature threshold, the process proceeds to S105, and the user is notified that the battery B might be overcharged. Subsequently, the process proceeds to S106, and the controller 50 stops the charging function of the battery B.

On the other hand, when an affirmative determination is made in S202 that the temperature in the sealed container 3 is higher than the temperature threshold, the process proceeds to S301, and the user is notified that thermal runaway might occur in the battery B. Subsequently, the process proceeds to S302, and the controller 50 stops all functions of the battery B. When the processes of S106 or S302 end, this routine ends temporarily.

In this routine, when the pressure in the sealed container 3 is higher than the pressure threshold and the temperature in the sealed container 3 is lower than or equal to the temperature threshold, it is determined that the battery is in an overcharged state, but the thermal runaway has not occurred, and only the charging function of the battery B is stopped. On the other hand, when the pressure in the sealed container 3 is higher than the pressure threshold and the temperature in the sealed container 3 is higher than the temperature threshold, it is determined that the thermal runaway might occur and all the functions of the battery B are stopped. Accordingly, changing the contents of the process to be performed on the battery B based on the degree of abnormality of the battery B allows optimum control in accordance with the situation.

Figure 7A:
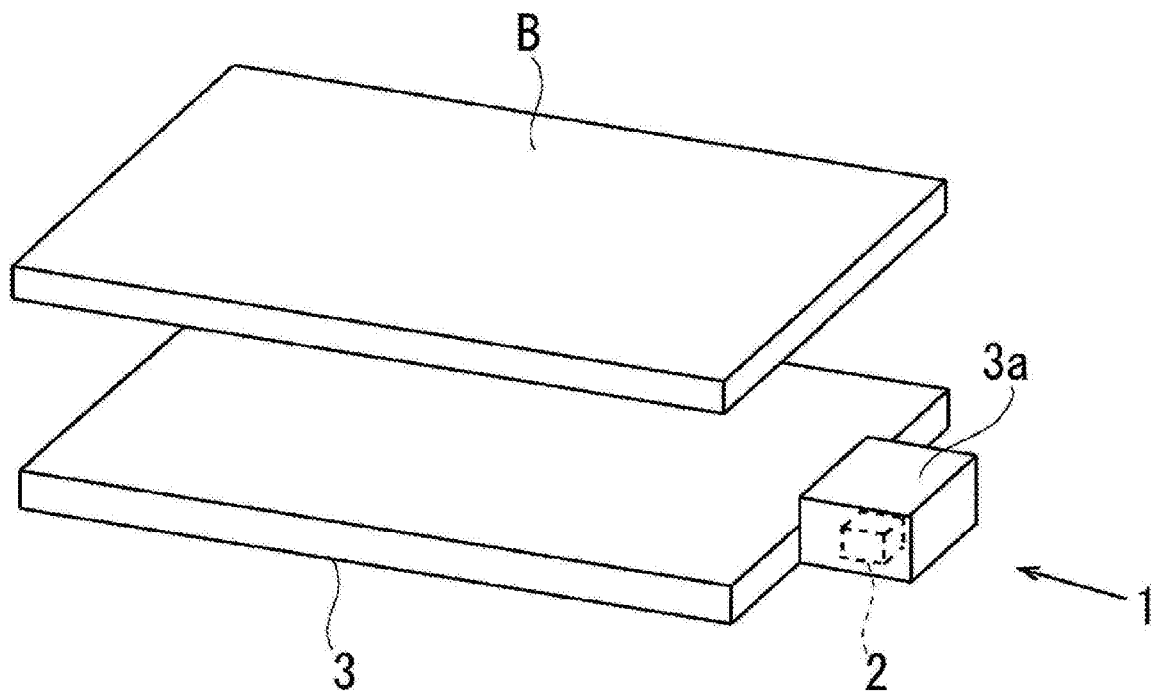
FIGS. 7A and 7B are perspective views of a second aspect of the abnormality detector according to the first embodiment of the present invention.
Figure 7B:
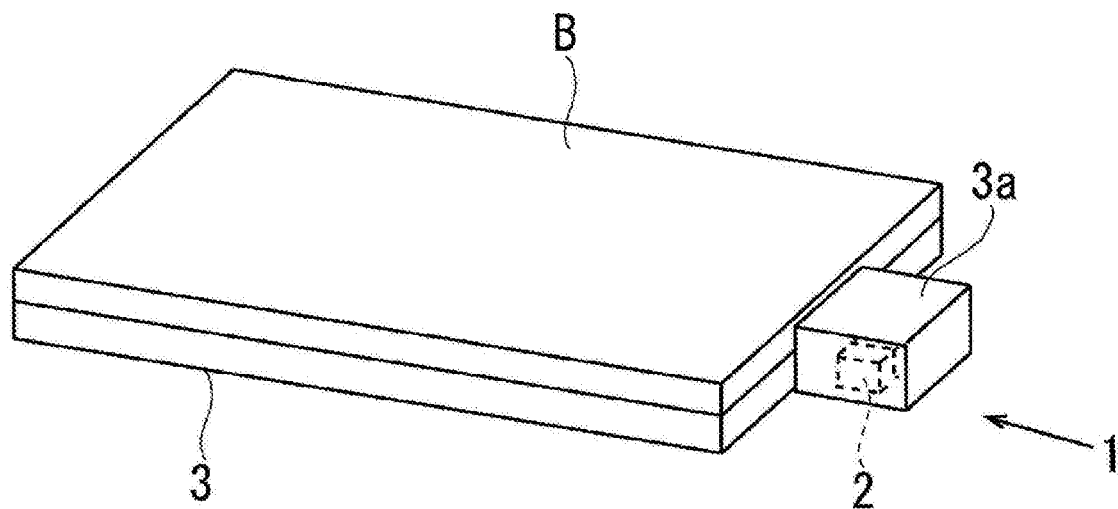

FIGS. 7A and 7B illustrate another aspect of the abnormality detector 1 in the embodiment. In this aspect, the thickness of the rectangular parallelepiped portion in close contact with the battery B in the sealed container 3 is configured to be thinner than that illustrated in FIGS. 2A and 2B. An expanded portion 3a which is not in close contact with the battery B is provided, and the thickness of the expanded portion 3a is set to be equal to a total thickness obtained by bringing the sealed container 3 and the battery B into close contact with each other. Further, in the sealed container 3, the rectangular parallelepiped portion in close contact with the battery B and the expanded portion 3a internally communicate with each other, and the pressure can thus propagate without any obstruction. The pressure sensor 2 is provided inside the expanded portion 3a. Although the controller 50 is provided also in this aspect, it is omitted in FIGS. 7A and 7B.

Figure 8A:
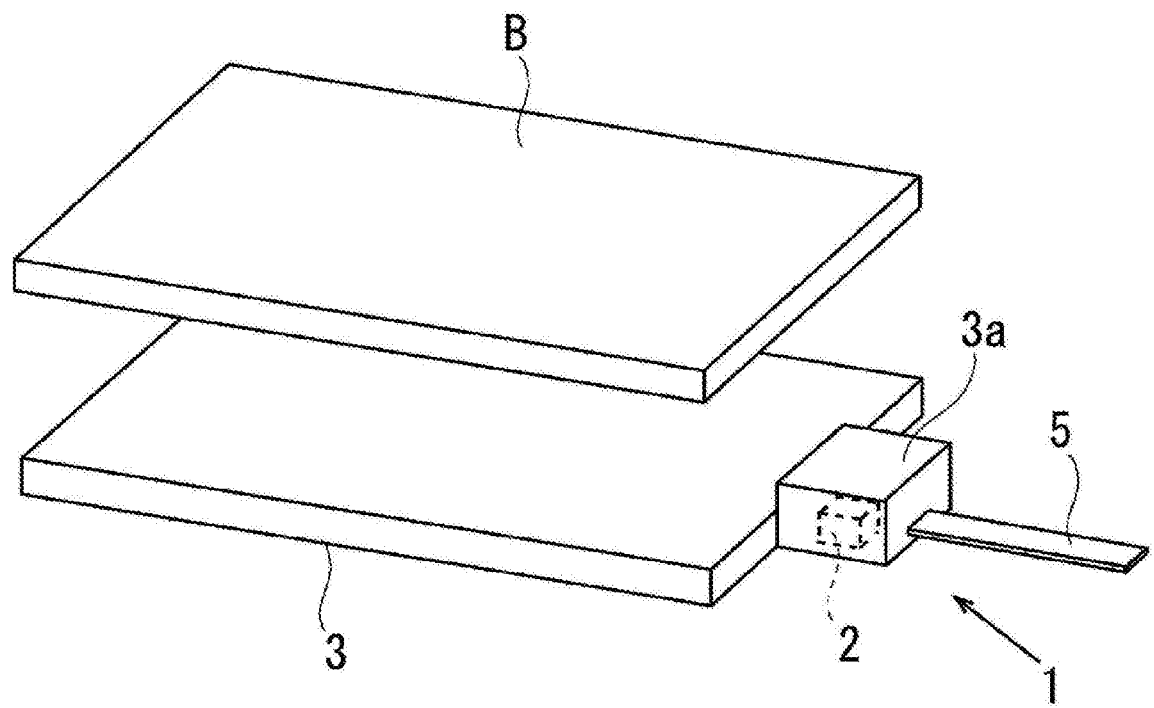
FIGS. 8A and 8B are perspective views of a third aspect of the abnormality detector according to the first embodiment of the present invention.
Figure 8B:
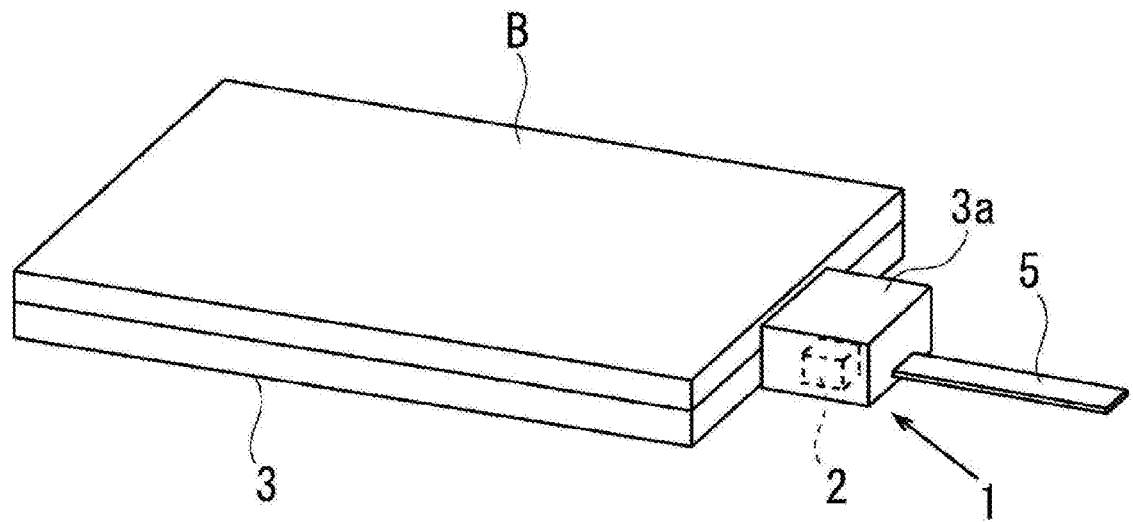

With such a configuration, it is possible to make a total thickness of the battery B and the sealed container 3 thin and also possible to store the battery B and the sealed container 3 into a thin mobile device. Further, in this aspect, as illustrated in FIGS. 8A and 8B, an FPC 5 as the signal line of the pressure sensor 2 may be pulled outward from the expanded portion 3a. According to this, it is possible to acquire a signal of the pressure sensor 2 only by connecting an FPC connector, and facilitate assembly even in the case of incorporation into the mobile device or the like. In this aspect, a portion in close contact with the battery B in the sealed container 3 corresponds to a first portion in the present invention. The expanded portion 3a corresponds to a second portion of the present invention.

Figure 9:
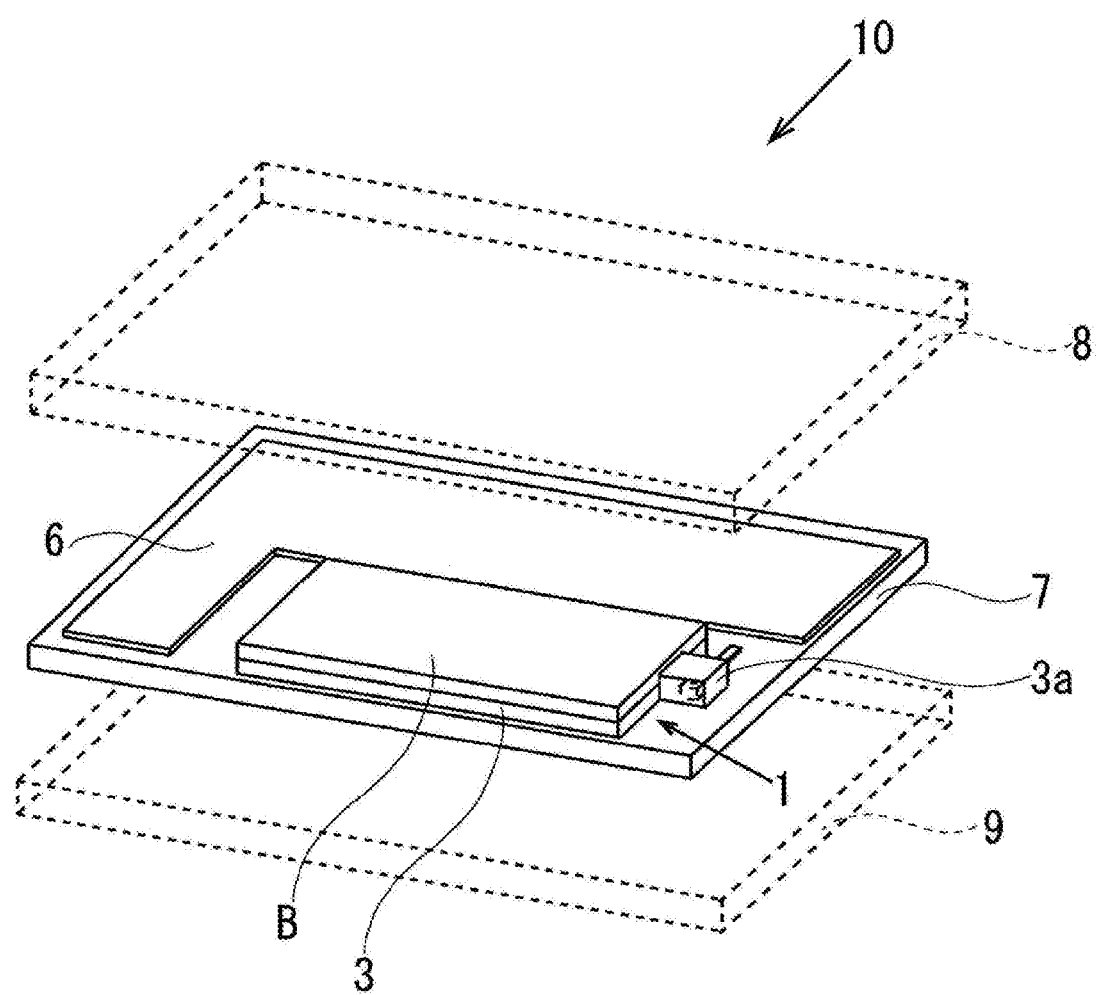
FIG. 9 is an exploded perspective view illustrating a state where the abnormality detector according to the first embodiment of the present invention is housed in a smartphone.

Next, FIG. 9 is an exploded perspective view illustrating an example of a configuration in a case where the battery B and the abnormality detector 1 in the embodiment are housed in a smartphone 10. The smartphone 10 is assembled with a configuration where, other than the battery B, the abnormality detector 1, and a control board 6, a cabinet 7 mounted with sensors (not illustrated) and connectors are held between a rear cover 8 and a front cover 9 including a display device. In this example, the controller 50 is included in the control board 6. The abnormality detector 1 in the embodiment can be easily housed in the smartphone 10 with such a configuration. Thus, by applying the abnormality detector 1 in the embodiment to the smartphone 10, it is possible to quickly detect an abnormality of the battery B and ensure the safety of the battery B, in smartphone batteries which have been required to have more reliable safety in view of current circumstances as to the increasing danger of heat generation, smoking, and ignition and the increasing penetration rate of smartphones.

Further, in this example, the sealed container 3 is disposed inside the smartphone 10 while being sandwiched between the battery B and the wall surface of the cabinet 7. Accordingly, when the battery B is deformed, the deformation of the surface of the sealed container 3 on the side opposite to the battery B is restricted by the wall surface of the cabinet 7, and hence the deformation of the battery B can be more reliably converted into a change in pressure in the sealed container 3.

Figure 10:
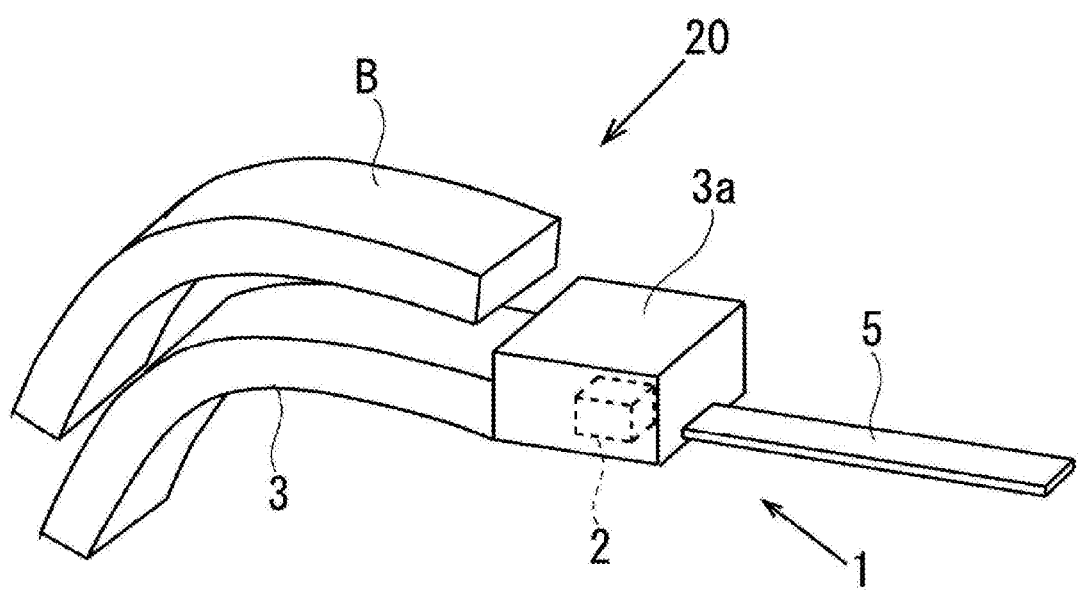
FIG. 10 is a perspective view of a fourth aspect of the abnormality detector according to the first embodiment of the present invention.

Next, FIG. 10 illustrates an example where the abnormality detector 1 according to the embodiment is applied to the battery B intended for a wearable device 20 such as a watch type. Although the controller 50 is provided also in this example, it is omitted in FIG. 10. In FIG. 10, the battery B has a curved shape so that it can be housed into the wearable device 20 such as the watch type. Further, in this case, the sealed container 3 can be bent in accordance with the shape of the battery B and can be brought into close contact with the bottom surface of the battery B regardless of the shape of the battery B, thereby ensuring a wide contact area. Thus, even in the wearable device 20 such as the watch type, it is possible to more accurately detect a change in pressure due to deformation of the battery B and more accurately detect an abnormality of the battery B.

In the embodiment, the sealed container 3 is formed of the material obtained by laminating the aluminum film and the resin film, and the material for the sealed container 3 is not limited thereto. Although desirably having a higher tensile strength, the sealed container 3 may be formed only of a resin film with flexibility. Further, the temperature sensor packaged together with the pressure sensor 2 is provided in the sealed container 3, and since the material for the sealed container 3 desirably has a high thermal conductivity in the case of measuring the temperature inside the sealed container 3, the sealed container 3 may be formed of a material with a thermal conductivity of 0.1 W/(mK) or higher. The material for the sealed container 3 is desirably flame-retardant. From this viewpoint, the material for the sealed container 3 may be, for example, a flame-retardant PET film, a flame-retardant PPS film, a flame-retardant aramid film.

In the embodiment, the fluid filled in the sealed container 3 is water, and the material for the fluid is not limited thereto. The temperature sensor packaged together with the pressure sensor 2 is provided, and since a thermal conductivity of the fluid is desirably high in the case of measuring the temperature inside the sealed container 3, there may be used a fluid with a thermal conductivity of 0.1 W/(mK) or higher. As an example, other than water (thermal conductivity=0.5 W/(mK) or higher), silicone oil (thermal conductivity=0.2 W/(mK) or higher) can be mentioned. Further, it is desirable that the material for the fluid is also flame-retardant. From this viewpoint, the fluid may contain a flame-retardant silicone or a flame-retardant liquid. Further, the fluid may contain at least one of an inert gas, a carbon dioxide gas and a nitrogen gas.

In the above embodiment, when the pressure sensor 2 measures the pressure inside the sealed container 3, it may detect a periodic component in a predetermined frequency region in addition to a non-periodic component of the pressure. There are some not clarified yet in the phenomenon that the occurrence of abnormality of the battery B can be detected with higher sensitivity. However, in addition to measuring the non-periodic increase in the pressure inside the sealed container 3, the periodic component in the predetermined frequency region is detected, thereby making it possible to detect generation of bubbles and boiling in the battery B, and more accurately detect an abnormal heat generation phenomenon accompanying generation of bubbles and boiling. The frequency region at that time may be set by experimentally verifying a frequency of sound waves and vibration that are generated at the time of generation of bubbles and boiling in advance.

Second Embodiment

Next, a second embodiment of the present invention will be described. In the embodiment, an example will be described in which the pressure sensor in the abnormality detector is disposed outside the sealed container, rather than in the sealed container.

Figure 11A:
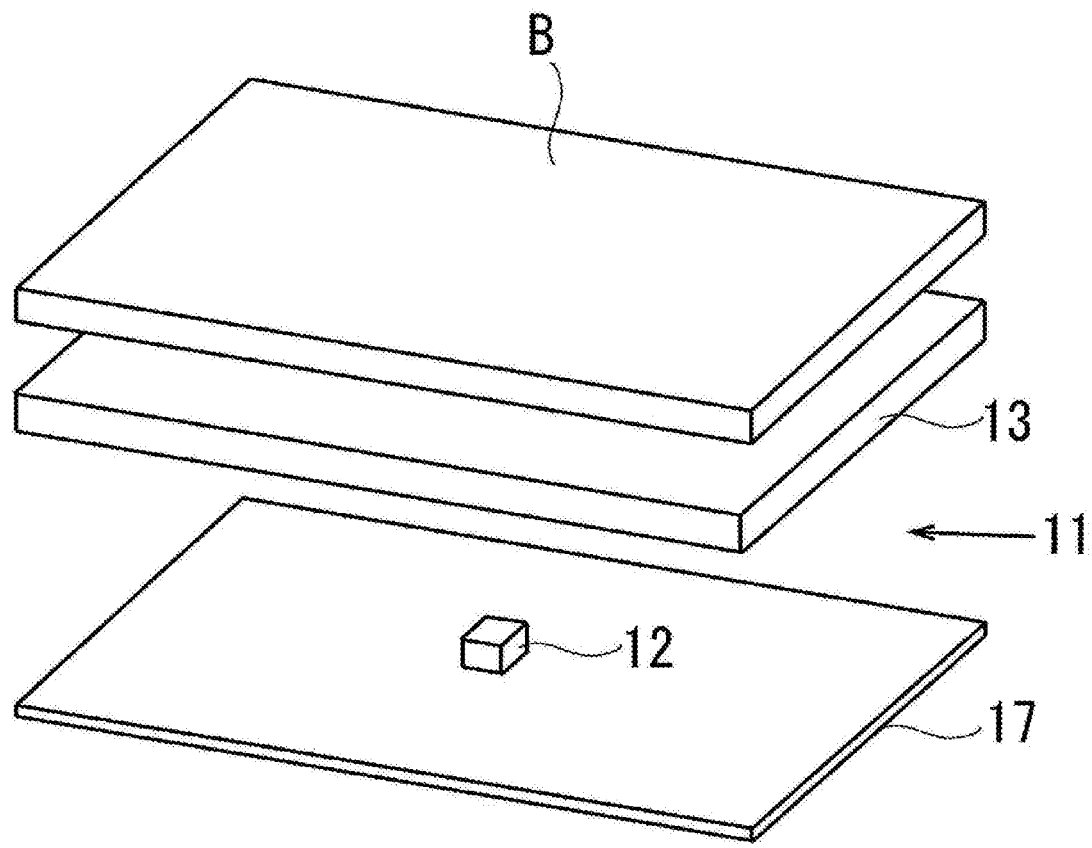
FIGS. 11A and 11B are perspective views of an abnormality detector according to a second embodiment of the present invention.
Figure 11B:
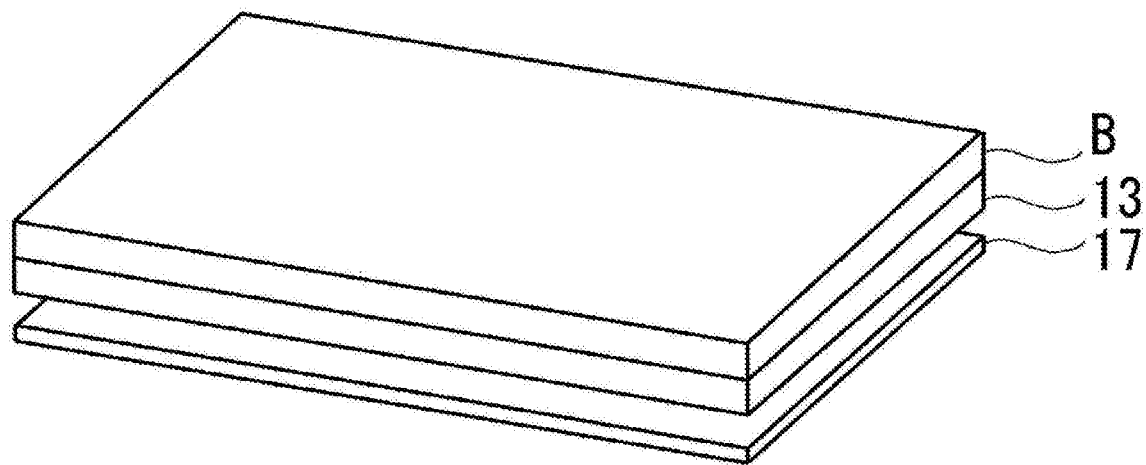

FIGS. 11A and 11B are perspective views of an abnormality detector 11 in the embodiment. FIG. 11A is a view illustrating the battery B, a sealed container 13, a pressure sensor 12, and a control board 17. FIG. 11B is a view illustrating placement of the battery B, the sealed container 13, the pressure sensor 12, and the control board 17 when being housed into a mobile device such as a smartphone. In the embodiment, the sealed container 13 is a container having a flat rectangular parallelepiped shape in which a fluid for converting deformation of the battery B into pressure is sealed. The pressure sensor 12 is mounted on the control board 17. In the embodiment, the controller 50 is included in the control board 17.

In the embodiment, as illustrated in FIG. 11B, the sealed container 13 is disposed in a state sandwiched between the battery B and the control board 17. Then, when an abnormality occurs in the battery B and it is deformed, the sealed container 13 also tends to be deformed accompanying the deformation. Meanwhile, in the sealed container 13, since the surface opposite to the surface in close contact with the battery B is in close contact with the control board 17 and its deformation is restricted, the pressure in the sealed container 13 changes with high sensitivity due to the deformation of the battery B. This pressure acts on the pressure sensor 12 disposed outside, thereby allowing the pressure sensor 12 to measure the change in pressure inside the sealed container 13 with higher sensitivity.

In the embodiment, since the pressure sensor 12 itself may only be mounted on the control board 17 similarly to other peripheral components, the mounting is easy, enabling omission of a signal line and a connector for electrically connecting the inside and the outside of the sealed container 13. Further, this enables improvement in sealability of the sealed container 13.

Figure 12A:
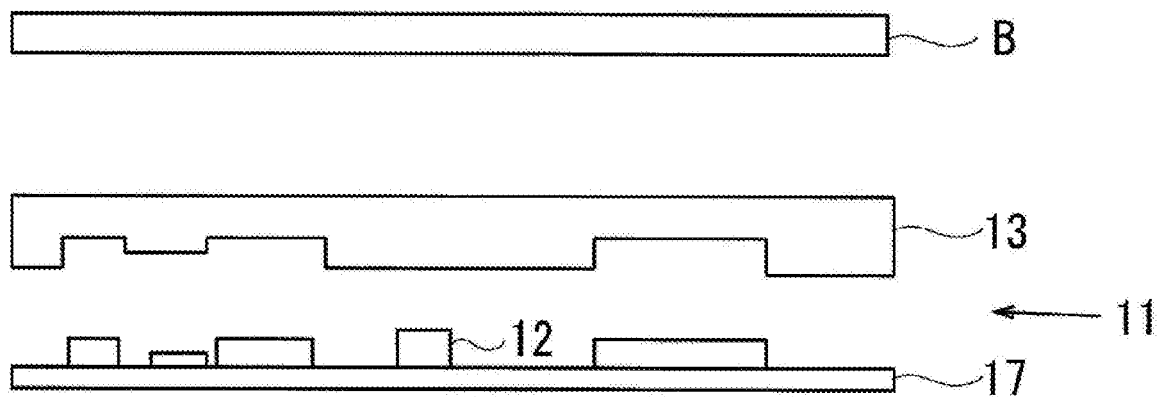
FIGS. 12A and 12B are views illustrating a second aspect of the abnormality detector according to the second embodiment of the present invention.
Figure 12B:
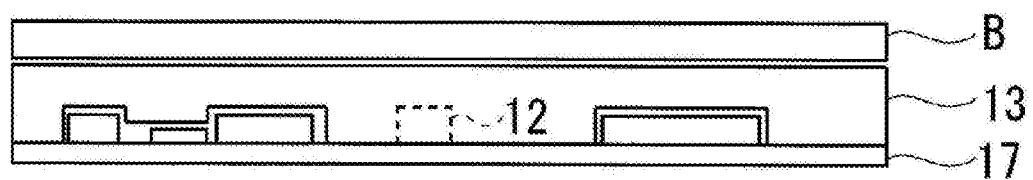

Next, FIGS. 12A and 12B illustrate an aspect in which the surface of the sealed container 13 on the side of the control board 17 is formed to be sufficiently in close contact with the pressure sensor 12, but is formed so as to reduce interference with the other components mounted on the control board 17, in the embodiment.

As illustrated in FIG. 12A, in this aspect, the surface of the sealed container 13 on the side of the control board 17 is formed in such a shape as to reduce interference with the mounting components of the control board 17 except for the pressure sensor 12. Accordingly, when the mounting components are housed in the mobile device, as illustrated in FIG. 12B, the sealed container 13 and each of the mounting components other than the pressure sensor 12 may have a gap therebetween, or may be disposed to such an extent as to be lightly in close contact with each other. On the other hand, the sealed container 13 and the pressure sensor 12 are disposed so as to be strongly in close contact with each other as in the example illustrated in FIGS. 11A and 11B.

According to this, while the battery B is housed in the mobile device, or even when the battery B is thereafter deformed due to occurrence of an abnormality in the battery B, stress can be suppressed from acting on the mounting components of the control board 17 and the pressure sensor 12 can accurately measure a change in pressure due to the deformation of the battery B. In this aspect, the shape formed in the sealed container 13 for reducing interference with the mounting components of the control board 17 corresponds to a recess in the present invention.

In FIGS. 12A and 12B, the example has been described where the pressure sensor 12 is disposed outside the sealed container 13. However, the aspect that the surface on the side of the control board 17 of the sealed container 13 is formed so as to reduce interference with the mounting components on the control board 17 is also applicable to a case where the pressure sensor is disposed in the sealed container.

Third Embodiment

Next, a third embodiment of the present invention will be described. In the embodiment, a description will be given of an example where both the battery and the pressure sensor are included inside the sealed container.

Figure 13:
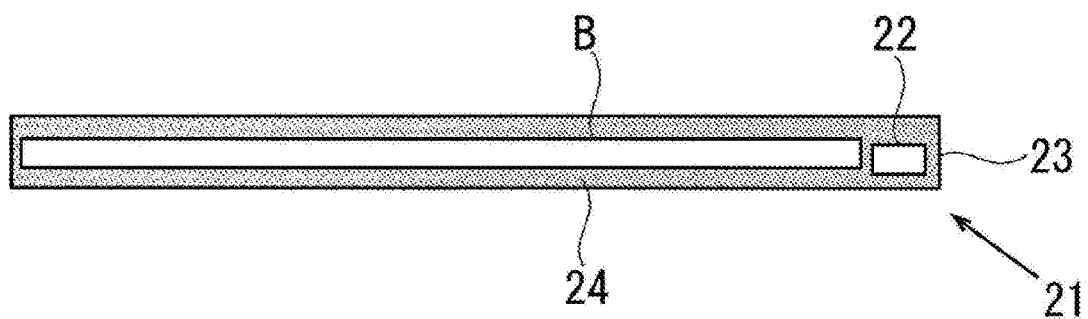
FIG. 13 is a cross-sectional view of an abnormality detector according to a third embodiment of the present invention.

FIG. 13 is a transverse sectional view of an abnormality detector 21 in the embodiment. As illustrated in FIG. 13, in the embodiment, in addition to a fluid 24, the battery B and a pressure sensor 22 are included in a sealed container 23. Although the controller 50 is provided also in this example, it is omitted in FIG. 13. With this configuration, when an abnormality occurs in the battery B and the battery B is deformed, the pressure in the sealed container 23 increases, and the pressure sensor 22 can detect this increase in pressure. As a result, it is possible to detect the abnormality of the battery B only inside the sealed container 23, thereby eliminating the need to consider disposing the sealed container so as to be sandwiched between the battery B and the other member, for example, and it is thus possible to enhance the flexibility in design of the abnormality detector.

The material for the sealed container 23 in the embodiment may be the same as that in each of the first and second embodiments, but it does not necessarily need to have flexibility. Hence in the embodiment, it is possible to enhance the flexibility in the material of the sealed container 23.

In the above embodiment, the example has been described where the article as the target for abnormality detection is a lithium-ion battery. However, the present invention is applicable to any target so long as the target has the possibility of being deformed due to a quality abnormality of the article. For example, the present invention is applicable to abnormality detection for batteries in addition to the lithium-ion battery, as well as a cylinder for a gas cartridge stove, a gas lighter, a pneumatic can, a waste liquid plastic container, a pressure pot, and a rice cooker.

Further, the pressure measurement by using the sealed container and the pressure sensor shown in the above embodiments is applicable to a scale, a body composition meter, a health check of an animal such as a pet, a presence/absence check of a pet, a condition determination of a passenger on a seat of an automobile or the like, a user presence/absence check by using a chair or a cushion, weight measurement in the chair or the cushion, entrance/exit management by using a floor mat, a weighing scale, a musical instrument (percussion instrument), and the like.

The invention claimed is:

1. An abnormality detector for measuring deformation of an article to detect an abnormality of the article, the abnormality detector comprising:
    a sealed body disposed in close contact with at least a part of an outer surface of the article, while containing and sealing a predetermined fluid, the sealed body having flexibility;
    a sensor configured to measure a change in pressure of the predetermined fluid contained in the sealed body, accompanying deformation of the article; and
    an electronic substrate, whose movement relative to the article is restricted, having an electronic component mounted thereon, wherein
    the sensor is disposed in contact with an outer surface of the sealed body from outside of the sealed body, the sensor is sandwiched between the outer surface of the sealed body and the electronic substrate, and the sensor is mounted on the electronic substrate, and
    the sealed body is disposed in a state sandwiched between the article and the electric substrate.

2. The abnormality detector according to claim 1, further comprising a temperature measurement unit configured to measure a temperature of the article.

3. The abnormality detector according to claim 1, wherein the sensor detects a periodic component in a predetermined frequency region in addition to a non-periodic component in the change in pressure of the predetermined fluid.

4. The abnormality detector according to claim 1, wherein the predetermined fluid is made of a flame-retardant substance.

5. The abnormality detector according to claim 4, wherein the predetermined fluid contains at least any one of an inert gas, a carbon dioxide gas, and a nitrogen gas.

6. The abnormality detector according to claim 1, wherein the sealed body is made of a flame-retardant substance.

7. The abnormality detector according to claim 2, wherein a thermal conductivity of the predetermined fluid is 0.1 W/(mK) or higher.

8. The abnormality detector according to claim 2, wherein a thermal conductivity of the sealed body is 0.1 W/(mK) or higher.

9. A mobile device comprising the abnormality detector according to claim 1.

* * * * *